United States Patent
Mross et al.

[15] 3,673,552

[45] June 27, 1972

[54] METHOD AND APPARATUS FOR COMPILING MEASURED VALUES OF A VARIABLE PARAMETER

[72] Inventors: Siegfried Mross; Hans Grossheim, both of Bremen, Germany; Michel Aubert, Wimermeux, France

[73] Assignee: Fried Krupp Gesellschaft mit beschrankter Haftung, Essen, Germany

[22] Filed: March 30, 1970

[21] Appl. No.: 23,691

[30] Foreign Application Priority Data

March 28, 1969 Germany......................P 19 15 956.9

[52] U.S. Cl. ...............................340/3 R, 340/3 E, 340/3 F, 340/3 T, 340/206
[51] Int. Cl.........................................................G01s 9/68
[58] Field of Search ........................340/2, 3, 3 E, 3 T, 3 F, 5, 340/16 C, 203–208; 343/6

[56] References Cited

UNITED STATES PATENTS 3,444,510   5/1969   Tyndale et al. ..............................340/5

FOREIGN PATENTS OR APPLICATIONS

1,157,976   11/1963   Germany....................................340/3

*Primary Examiner*—Richard A. Farley
*Attorney*—Spencer & Kaye

[57] ABSTRACT

A method and apparatus primarily intended for commercial fishing craft for compiling at an observation station measured values of a variable parameter existing at one or more measuring locations spaced from the observation station by producing a signal which is a function of the instantaneous value of the variable parameter, feeding it to a pulse duration modulator, to produce a modulated pulse whose duration is a function of the instantaneous value of the variable parameter, and controlling the initiation of the modulated pulses by a system which emits a train of spaced wave pulses through one or more acoustical transducers, so that the initiation of the modulated pulses is in a fixed time relation with the wave pulses. A suitable short-interval range recording device is disposed at the observation station, and is connected for receiving the modulated pulses and recording their duration along with the echoes of the wave pulses. When a plurality of measured value generators is used, a programmed switch mechanism may be employed to connect the individual generators with their respective wave pulse generators.

19 Claims, 7 Drawing Figures

INVENTORS.
Michel Aubert
Siegfried Mross
Hans Grossheim

BY Spencer & Kaye
ATTORNEYS.

INVENTORS.
Michel Aubert
Siegfried Mross
Hans Grossheim

METHOD AND APPARATUS FOR COMPILING MEASURED VALUES OF A VARIABLE PARAMETER

BACKGROUND OF THE INVENTION

The present invention relates to a method for compiling at an observation station measured values of a variable gathered by a measuring station connected with the measuring station by a transmission channel, while measuring the distance of two separate points from a reference point; the points being encountered during the travel time of wave pulses or echo pulses, over the path between these two points or the echo path. In particular, for determining measured values from a measuring station disposed on a towed net at an observation station on board a ship.

It is known to transform such measured values, as for example, the water pressure at the towed net, into a value suitable for transmission, e.g. an oscillating frequency proportional to the water pressure, and to transmit this value to the observation station on board ship; where it is recorded, after being converted into a voltage value, on the writing strip of the echograph by means of a special curve tracer. Such transmissions and indications of measured values are complicated and can not be accomplished with conventional echo sounders without subjecting them substantial structural modifications.

SUMMARY OF THE INVENTION

It is an object of the present invention to provide a method and apparatus of the type discussed in the introductory paragraph, which are inexpensive and which permit the simultaneous compilation of a plurality of measured values with simple means.

In solving this problem, the present invention is based on the consideration that the measured values available at the measuring station must be used for the derivation of artificial echo pulses in order to be able to transmit them to the observation station, amplify them and record them in the same manner as the returning echo pulses from the echo sounding.

According to the present invention this is accomplished in that: instantaneous values of the variable are periodically converted into measured value signals the measuring station by means of pulse duration modulation; the duration $\tau$ of the signals corresponding to the instantaneous value of the variable, and their beginning $t_0$ being fixed in time with respect to a reference time point in the travel time of the echo pulses; and the signal duration of the measured value signal transmitted by the measuring station is measured at the observation station and used as a measure for the instantaneous value of the variable.

This results in the advantage that there need be no special clock pulse generator at the measuring station, since the timing for the pulse duration modulation is derived from the timing of the echo sounding. Preferably, a common short-interval ranging device is used to measure the travel time of the echo pulses, as well as the duration of the measured value signal by delivering the measured value signal to the returning echo pulse receiving channel. Depending on the type of device employed for the echo sounding, the beginning of the pulse duration modulation can be fixed in time with respect to the beginning or end point of the travel time of the echo pulses, so that it is either the emitted or the returning echo pulse which determines the zero time for the pulse duration modulation. When echo sounding from a towed net, it is possible, depending on whether the location of the wave transmitter and echo receiver at the towed net, or the surface of the water, or the bottom of the sea constitute the reference line for the indication of the echo pulses to use the moment at which the wave pulses are emitted, or the moment at which the echo pulses return after being reflected from the surface of the water or from the bottom of the ocean, as the reference time point for the zero time point of the pulse duration modulation.

In order to perform the novel method of the present invention, it is necessary that a pulse duration modulator connected with the output of the measured value generator and a secondary clock pulse generator which controls the beginning of each pulse duration modulation be provided to produce at the measuring station a measured value signal pulse having a duration which corresponds to the instantaneous value of the variable. The secondary clock pulse generator is connected to the means for fixed-time actuation in dependence on a reference time point of the travel time of the echo pulses emitted at a pulse repetition frequency $f$. A short-interval ranging device for the signal duration of the measured value signal transmitted by the measuring station must be available at the observation station.

It is advantageous for the transmission of the measured values that a generator for artificial echoes be provided which is connected with the pulse duration modulator and which at the end of the signal duration emits an artificial echo pulse adapted to the transmission characteristics of the particular transmission channel.

Such an artificial echo generator may consist of a monostable multivibrator connected with the output of the pulse duration modulator, and an oscillator connected to the multivibrator whose frequency preferably corresponds to the carrier frequency of the echo pulses. A special indicator for the transmitted measured values can be eliminated, and a common, preferably writing, short-interval ranging device with the measuring sequence frequency $f$ can be provided for the measurement and indication of the travel time of the echo pulses, as well as the signal duration of the measured value signals.

At the measuring station, a switching device for the pulse duration modulation factor may be provided which is actuated by switching pulses from the observation station in order to be able to adapt the signal duration derived from the instantaneous measured value to the scale range of the short-interval ranging device. If the short-interval ranging device is provided, as usual, with a range selector, it is possible, in order to make the scale for the indication of the measured value independent of the measuring range for the short-interval ranging, to construct the device in such a manner that the measuring range selector is coupled with a generator for the switching pulses. For this purpose, the measuring station may be particularly provided with a counting and gating circuit with which the pulse duration modulation factor may be switched to be inversely proportional for the measuring sequence frequency.

Advantageously, the secondary clock pulse generator for the pulse duration modulator will be so constructed that its frequency is at an adjustable ratio to the measuring sequence frequency. This results in multiple advantages; in particular, it makes it possible to produce a measured value indication which is different from the distance indication of the echo sounder device in that in the case of recording short-interval ranging devices the indication of the switching pulses continuously occurs one after the other, whereas the artificial echo pulses are recorded with gaps between them. There also results the possibility of deviating from the rapid echo sounding sequence and utilizing a much slower measuring sequence for the measured value transmission.

If the measuring station is provided with its own current source in the form of a battery, this current source can be switched on and off by control pulses emitted from the observation station in order to avoid an unnecessary drain on the battery during the measuring intervals. An automatic "on" and "off" switching of the battery is produced, according to the present invention, by providing a switching device at the measuring station which is combined with a timing, or sweep, circuit to switch the battery "on" and "off," so that it is switched "on" when echo pulses appear and is switched "off" when there are none. To switch the battery on and off, it is also possible to provide, at the measuring station, a water pressure sensitive switch which switches the battery on when a given minimum pressure has been exceeded.

The present invention can also be used to simultaneously, or selectively, compile a plurality of measured values. In this case, a plurality of measuring value generators are provided in one or more measuring stations; which generators are connected to means for fixed-time actuation of the echo pulses in dependence on the reference time point. The measured value signals of the different measuring value generators are provided with different indicia in order to be able to distinguish them at the observation station. It may be advantageous, in this case, not to record all the measured values in the short-interval ranging device for the determination of the travel time of the echo pulses, but to provide a separate short-interval ranging device, particularly one with digital indication, for some measured values.

The present invention has particular significance for the compilation of the temperature distribution in water during commercial fishing operations in order to position the net in areas having a temperature which is preferred by the fish and to keep the net in this area. The present invention provides that a measuring station be attached to a temperature measuring point at the top of the towed net and a second measuring station to a temperature measuring point at the bottom of the net.

The transmission of a plurality of measured values can also be accomplished in such a manner that a plurality of measured value generators can be interrogated by means of an intermediate switching mechanism. Particular switching advantages result when the switching mechanism is constructed as a shift register.

If a plurality of echo senders and receivers are attached to the towed net in such a manner that one can switch between a plurality of sounding directions, then the present invention provides that a switching to the different measuring value generators associated with the different sounding directions of the echo pulses may be coupled together with the switching to the different sounding directions of the echo pulses.

A programmed switching mechanism may also be provided to switch to the different sounding directions and to interrogate a plurality of measuring value generators.

DESCRIPTION OF THE PREFERRED EMBODIMENTS

Figure 1:
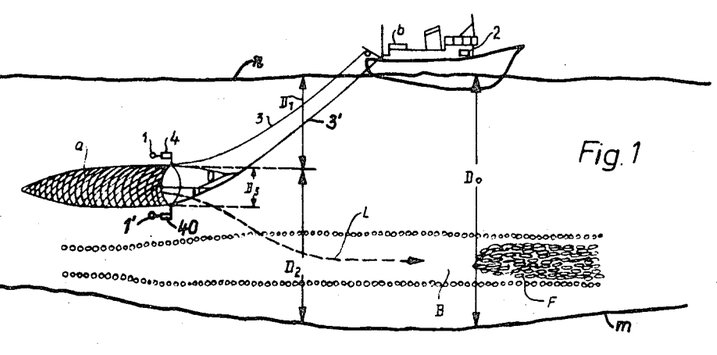
FIG. 1 is a schematic showing of a device according to the present invention being used during fishing.

The apparatus shown in FIG. 1 consists of a measuring station, or location, 1 which is attached to a towed net a, an observation station, or location, 2 which is disposed on board a ship b and a transmission channel 3 between measuring station 1 and observation station 2. The transmission channel 3 is a cable in the illustrated embodiment; however, it may also consist, in a known manner, of a transmission device which operates wirelessly either in part or entirely, for example a sound transmission path with electroacoustical transducers in the measuring station and in the observation station, as described e.g. in the British Pat. No. 1,061,954. These devices at both stations must then be modified, as distinguished from the embodiment described below, in a known manner to be compatible with a wireless transmission channel.

The present invention will be described below using a temperature measurement as the example of a variable parameter. The measuring station 1 is attached to the head cable of the towed net a in the vicinity of the echo sender and receiver 4.

Experience in the fishing industry has shown that a school of fish F prefers to stay in an area of substantially the same temperature, e.g. the temperature of 5° C. in what is called in the art a "temperature bubble" B. It is, therefore, important for fishing operations to direct the net a into the temperature bubble B, at whose periphery the temperature gradient usually shows a fluctuating behavior, and to hold it in this temperature bubble B as is shown by the dashed arrow line L.

Figures 2, 3:
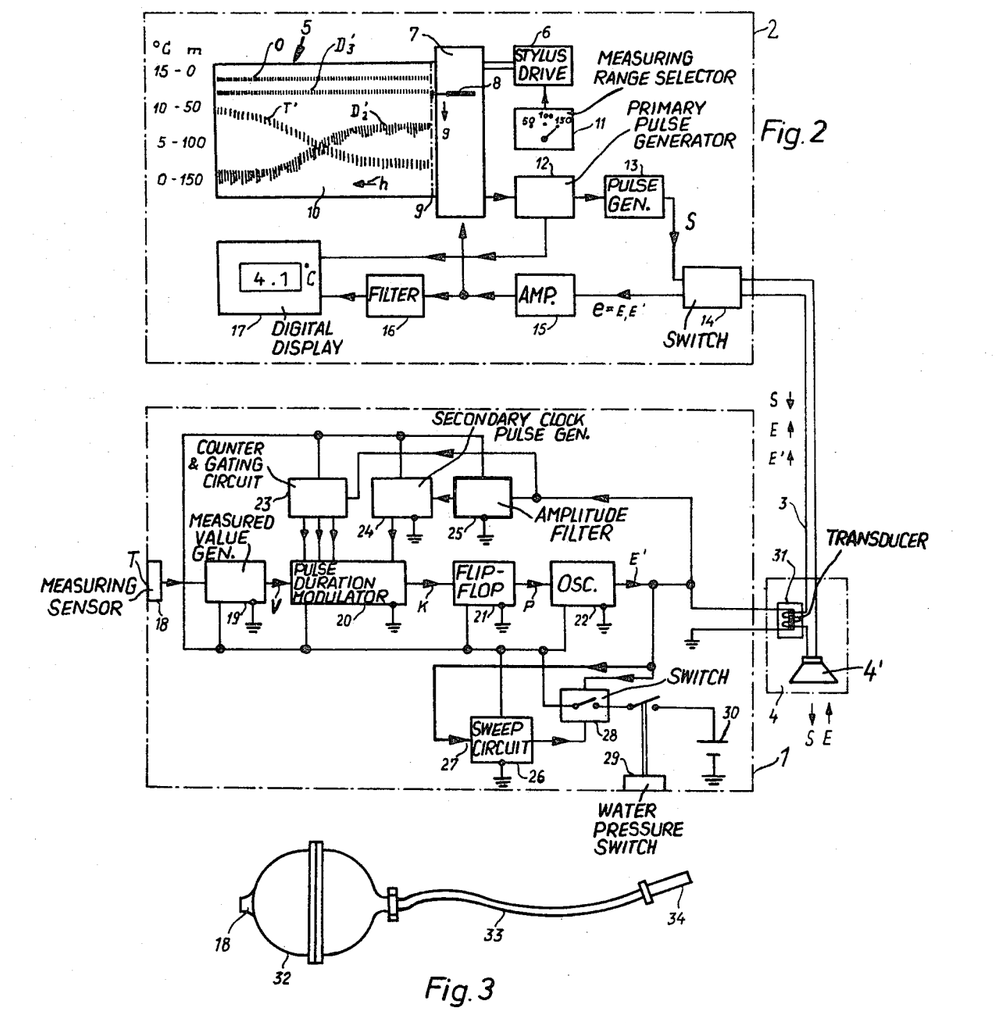
FIG. 2 is a schematic circuit diagram of a device according to FIG. 1.
FIG. 3 is a schematic diagram of an embodiment of a measuring station.

As shown in FIG. 2 one, or more measuring sensors 18 with connected measuring value generators 19 are provided at the measuring station 1. In order to record the fluctuations of the measuring value voltage V which appear at the output of the generators 19, and which are proportional to the temperature T at the observation station 2, the measured value voltage V is fed to a pulse duration modulator 20. This pulse duration modulator 20 converts, at certain spaced intervals which will be described in detail below, momentary values of the measured value voltage V into a rectangular, measured value pulse K. The signal duration $\tau$ of pulse K corresponds to the momentary value of the measured value voltage V, and is transmitted as the measured value signal after several conversions, which will be described in detail below, over the transmission channel 3 to the observation station 2. The signal duration $\tau$ is measured at observation station 2 and is used as a measure for the momentary value of the variable, in this case the temperature T measured by measuring value generator 19 or measuring sensor 18.

The observation station 2 is part of a device for determining the distance by measuring the travel time of echo pulses; the transmission channel 3 also being a part of this device. At the underwater end of the transmission channel 3 there is disposed an echo sender and receiver 4, which includes a suitable, known electroacoustic transducer, hereinafter called the echo sender, and a receiver e.g. a suitable, known magnetostriction oscillator, for emitting and receiving echo pulses. These two elements are indicated schematically in FIG. 2 as one element 4'. The outgoing echo pulses are marked S in FIG. 2, and the returning echo pulses are marked E; although these pulses are often modified on their way from the pulse generator 13 to their return thereto and indication on short-interval range recorder 5 at the observation station 2.

The short-interval range recorder 5 at the observation station 2 operates with a writing stylus 8 which is driven periodically in the arrow direction g by a known drive 6 with the aid if a stylus deflection device 7. The movement of device 7 occurs along a writing line 9 on a writing surface 10, which is moved in the direction of arrow h. The speed of the movement of writing stylus 8 can be varied by means of a measuring range selector 11, in order to adapt it to different distance measuring ranges of, e.g.: 0 ... 50 m, 0 ... 100 m, 0 ... 150 m.

A primary pulse generator 12 is synchronized with the range recorder 5 in such a manner that when the writing stylus 8 passes over the zero line 0 on the writing surface 10, a scanning pulse is emitted to the pulse generator 13. Direct electrical transmission of the scanning pulse from the pulse generator 13 and through a switch 14 and an amplifier 15 causes the zero line to be written. This zero line 0 is the origin of the travel time measurement and corresponds to the immersion depth $D_1$ of the echo sender and receiver 4, or the immersion depth of the towed net a at the head cable. This immersion depth $D_1$ can be measured by echo sounding toward the top, and with appropriate expansion of the range recorder device 5 it may be measured and indicated in the same manner as the distance $D_2$ of the head cable of the towed net a from the bottom.

The pulses E, returning to the sender-receiver in the form of echoes are recorded by the sound sender and receiver 4 and are fed through the transmission channel 3 and amplifier 15 to the writing stylus 8 as writing pulses. The echoes from the base cable, whose distance from the head cable indicates the height $D_3$ (see FIG. 1) of the opening of net a, which is significant for fishing operations, are continuously recorded on the writing surface 10 as the net opening curve $D_3'$; whereas the echoes from the bottom of the sea m produce a bottom curve $D_2'$ which corresponds to the distance $D_2$ (see FIG. 1) from the bottom.

Figure 4:
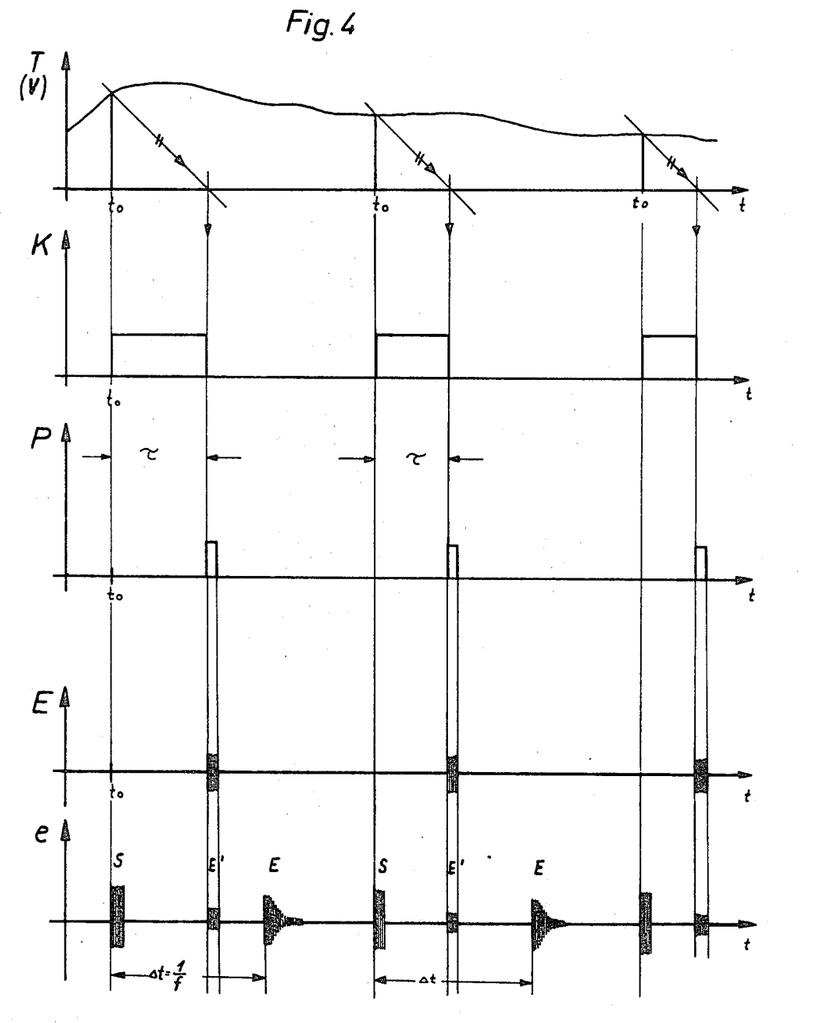
FIG. 4 is a graph showing the voltage-time diagram to illustrate the operation of the circuit according to FIG. 2.

The apparatus for measuring the distance by measuring the travel time of echo pulses by means of the observation station 2 described above corresponds completely to the construction of conventional apparatus of this type. The following will now describe, with the aid of FIGS. 2 and 4, how this device is used to compile the temperature values T available at the measuring station 1. At the observation station 2 there is available a short-interval range recorder 5 for measuring the travel time $\Delta t$ of the echo pulses in the water. These pulses serve as a measure for the distances $D_2$ and $D_3$ to be recorded. In order to be able to record, with the same range recorder device 5, the signal duration $\tau$ of the measured signals from measuring station 1, which are present at the output of the pulse duration modulator 20, the actuation of the pulse duration modulator 20 is accomplished by a secondary clock pulse generator 24 which is synchronized with the primary clock pulse generator 12 at the observation station 2. For this purpose, the emitted echo sounding pulses S are inductively sent from transmission channel 3 to the secondary clock pulse generator 24 by means of a transmitter 31, so that the actuation of the pulse duration modulator 20 at time $t_0$ occurs synchronously with the zero passage of the writing stylus 8 and at the time of emission of the outgoing echo pulse S by the echo sender 4'. The secondary clock pulse generator 24, however, permits only part of the outgoing echo pulses S to pass, so that an actuation pulse is given to the pulse duration modulator 20, for example, only with each tenth echo pulse S.

The measuring pulse K (see FIG. 4) emitted by the pulse duration modulator 20 having a signal duration $\tau$ is given to a monostable multivibrator 21, which emits, at the end of the measured value pulse K, a short measured value scanning pulse P (see FIG. 4) whose starting edge has a spacing from zero point $t_0$ which is equal to the signal duration $\tau$ is fed to an oscillator stage 22. During the duration of this measured value scanning pulse P, the oscillator stage 22 emits an alternating voltage, the artificial echo pulse E', to transducer 31; the frequency of this voltage preferably corresponding to the carrier frequency of either the echo pulse S or E. Hence, artificial echo pulses E', whose time spacing from the zero point $t_0$ corresponds to the signal duration $\tau$ and, thus, to the momentary value of measured value voltage V taken from the measured value generator 19 at the zero time point $t_0$ and to the momentary value of the variable T, which here is the temperature measured at the head cable of the towed net $a$, reach the transmission channel 3 from the measuring station 1 just as the time interval of the arrival of the echo pulses E returning from the water due to reflection corresponds to the present distance of the sound-reflecting objects in the water from the echo sender and receiver 4.

The artificial echo pulse E' and the echo pulse E returning from the echo path reach switch 14 and amplifier 15 as pulse sequence $e$ which is then fed to the writing stylus 8 where it produces the temperature curve T' on the writing surface 10 of the short-interval range recorder 5. From the course of this temperature curve T', it can be clearly seen how the temperature falls to a value of approximately 4° C. when the net $a$ passes from the area above the temperature bubble B into the area of the temperature bubble B. The measured temperature value can be read from a scale, as shown, for example, in the left portion of FIG. 2, which has, for example, a temperature measuring range of 0° to 15° C.

It is possible to also provide a digital short-interval measuring device 17 to indicate the temperature T. Such devices are well known in the art. In order to make possible in this case a distinction between the artificial echo pulses E' and the returning echo pulses E, the artificial echo pulses E' are provided with an identification, e.g. a frequency different than the carrier frequency of the echo pulses, so that they can be separated from one another in a filter 16 and can then be transferred to the digital read-out 17. Such a digital indication may be provided either in addition to or instead of the recording on the writing surface 10. In both cases the synchronization is accomplished by the actuation of the pulse duration modulator 20, with the aid of the emitted echo sounding pulses S at zero time $t_0$.

The conventional echo sounders are provided with a measuring range switching device for ranges from, e.g., 0 to 50 m, 0 to 100 m and 0 to 150 m. The changing of the measuring range has the result that the echo pulses S are emitted at correspondingly different measuring sequence frequencies $f$. To make the scale for the temperature indication independent of the range being used, the pulse duration modulator 20 is provided with a voltage divider, not shown in the drawings, which has, for example, two stages, which are automatically switched when the measuring range switch 11 is actuated, so that different partial voltages of the measured value voltage V are effective in the pulse duration modulator 20. This automatic switching of the pulse duration modulation factor $k = \tau/T$ is accomplished by a counting and gating stage 23, which is controlled by the outgoing echo pulses S and which has three outputs associated with the different measuring ranges. Always that output becomes effective which corresponds to measuring sequence frequency $f$ of the echo pulses S associated with the switched-on measuring range at the measuring range selector 11.

The measuring station 1 is supplied with current by a battery 30 through a switching device 28. This switching device is switched on by a switch-on pulse actuated by an outgoing echo pulse S, and is switched off by a switch-off pulse emitted by a sweep circuit 26. The sweep circuit 26 is so constructed that it produces a switch-off pulse, for example, three minutes after its start, due to switching on the current supply. With the next-following outgoing echo pulse S, the current supply is then switched on again and the sweep circuit 26 is restarted. In practice, the switching off by the sweep circuit 26 becomes effective only when the outgoing echo pulses S do not appear. This is the case, for example, when the device is switched off for echo sounding in the observation station 2.

The sweep circuit 26 can also be so constructed that it does not emit a switch-off pulse as long as outgoing echo pulses S come through a connecting line to a control input 27 of the sweep circuit 26 (see FIG. 2).

In addition, a water pressure switch 29 may be provided with which the current supply of the measuring station 1 is switched on only after a given minimum pressure has been exceeded. Such switches are well known in the art.

FIG. 3 shows an embodiment of the mechanical structure of the measuring station 1. The structural groups of measuring station 1 are housed in a water-tight, pressure resistant housing 32, which is connected with a plug 34 via a cable 33. The plug 34 contains the primary side of the transducer 31 and serves for the inductive coupling of the measuring station 1 to the transmission channel 3. The secondary winding of the transducer 31 is housed in the housing of the echo sender and receiver 4 (not shown in detail).

Figure 5:
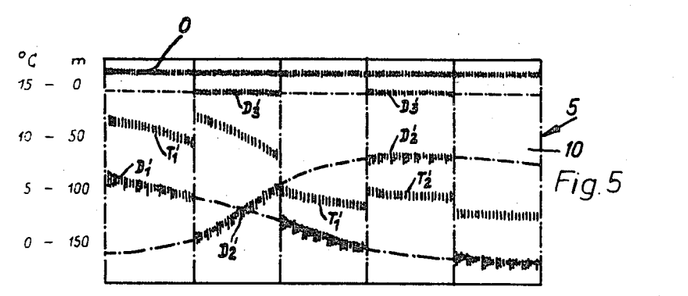
FIG. 5 shows an echograph of a recording of two temperature curves for a modified embodiment of an echo sounder having two measuring stations.

If the sounding is performed from the net by alternating sounding toward the bottom and the top with two switchable echo senders and transmitters to measure the distance from the bottom $D_2$ as well as the immersion depth $D_1$ of the net $a$, the echo sounder may be constructed in a known manner as disclosed in U.S. Pat. application No. 749,762 of Aug. 2nd 1968, now U.S. Pat. No. 3,523,276, so that an echo sounding toward the bottom is switched after, for example, 5 minutes to a sounding toward the top and vice versa; or so that the two echo senders and receivers are switched by a switching device disposed in a common housing which is actuated by a control switch at the observation station 2. The short-interval range recorder 5 can be so constructed that the zero line 0 of the recording forms a continuous straight line at the upper edge of the writing surface 10 during the sounding toward the top as well as during the sounding toward the bottom, as shown in FIG. 2, and that the immersion depth $D_1$ and the distance from the bottom $D_2$ are written from the zero line 0 down. FIG. 5 shows that the bottom curve $D_2'$ is here written in the same manner as in the device according to FIG. 2, where interruptions of the curve result only for the time of sounding upwardly for the determination of the immersion depth $D_1$.

In this embodiment of the echo sounding device according to the present invention, it is possible to use two measuring stations which are then associated with the two sounding directions. In the illustrated embodiment, a first measuring station 1 is disposed at a temperature measuring point at the top of the head cable of the net $a$, and a second measuring station 1' is disposed at a temperature measuring point at the bottom at the base cable of the net $a$ and connected to the observation station 2 by transmission channel 3'. The measuring stations 1, 1' are each coupled with a transducer (not shown) at the associated echo sender and receiver 4 and 40, respectively. The temperature curves $T_1'$ and $T_2'$ are shown in FIG. 5 as interrupted curves, since the sounding is done alternatingly downward and upward.

Figure 6:
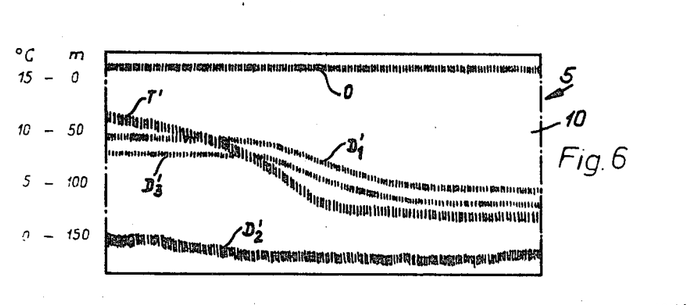
FIG. 6 shows an echograph of another embodiment of an echo sounder with only one temperature curve.

To produce a natural image, i.e., an image resulting from the conditions shown in FIG. 1, it is known to construct the echo sounder so that the surface n of the ocean appears always as a straight line on the zero line 0 of the writing surface 10 of the short-interval range recorder 5, independent of the depth of the towed net $a$. The depth curve $D_1'$ then becomes, as shown in a curve in FIG. 6, a true representation of the actual movement of the towed net a according to FIG. 1.

In a corresponding manner, the curve $D_2'$ corresponding to the base cable of net $a$ is also recorded, which curve corresponds to the natural course of the bottom of the sea m as shown in FIG. 1.

When employing measuring stations according to the present invention with echo sounders of this type, it is necessary that the actuating pulses which are emitted by the secondary clock pulse generator 24 at the measuring station 1 and given to the pulse duration modulator 20 are coupled in fixed time relationship with the returning echo pulse from the surface of the water $n$. Care must be taken, therefore, that the strong outgoing echo pulses S are kept away from the secondary clock pulse generator 24, and only the much weaker returning echo pulses E from the surface of the water $n$ are permitted to pass to the secondary clock pulse generator 24. For this reason, as is shown in FIG. 2, an appropriately constructed amplitude filter 25 is connected ahead of the control input of the secondary clock pulse generator 24. The construction of such filters is well known in the art. This filter 25 must be so constructed that only the echo pulses E returning from the surface of the water n cause the secondary clock pulse generator 24 to be actuated, whereas echo pulses originating from other reflecting objects, particularly from fish, and the returning echo pulses S remain below the threshold. Depending on the type of embodiment employed, it may be additionally necessary to provide a delay time in the secondary clock pulse generator 24 between the reference time point, i.e. the arrival of the echo pulse E from the surface of the water $n$ and the zero time point $t_0$, the beginning of the pulse duration modulation.

Figure 7:
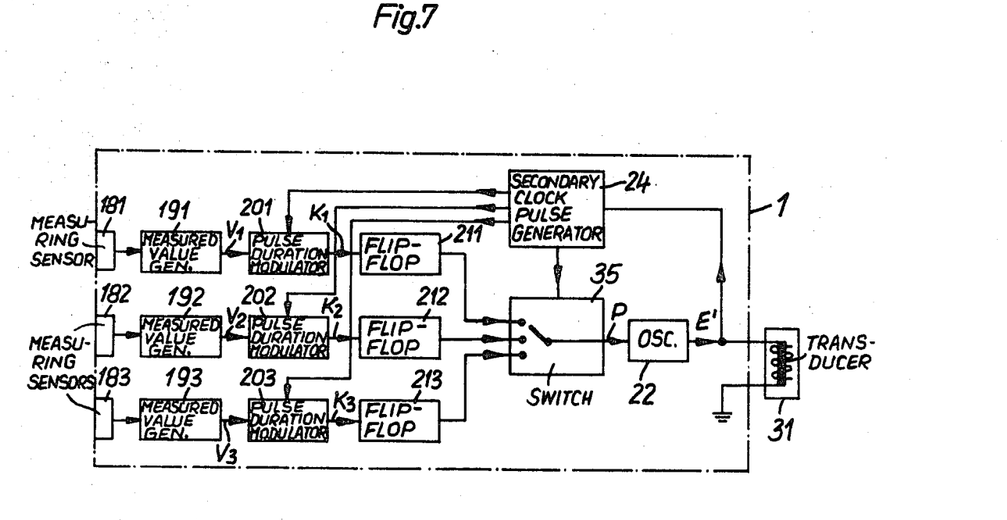
FIG. 7 is a schematic diagram of a further embodiment of the apparatus according to the present invention.

In another embodiment of the measuring station 1 according to the present invention, there may be provided, as shown in FIG. 7, a switching mechanism 35 with which different measuring value generators 191-193, e.g. for temperature and salt content of the water and degree of filling of the net, are consecutively interrogated, either individually or in groups. A plurality of sensors 181-183 are provided, one for each generator. The switching mechanism 35, which is advantageously constructed as a conventional shift register, is actuated by the secondary clock pulse generator 24 and after, for example, every 50th sounding is switched over one step. The secondary clock pulse generator 24 also actuates the pulse duration modulation in the pulse duration modulators 201-203, which receive signal v.1-v.3 from the measuring value generators 191-193 respectively, at the same moment as the generator 24 is switched over one step. To distinguish the different measured value signals, the artificial echo pulses E' are provided with different indicia. The secondary clock pulse generator 24 may be so constructed for this purpose that the measuring value generators 191-193 are interrogated with differing frequency; e.g. the measuring value generator 191 at each 5th sounding, measuring value generator 192 at every 10th sounding and measuring value generator 193 at every 15th sounding. The artificial echo pulses E' of the different measured value signals are, thus, recorded with different spacings on the short-interval range recorder 5. The pulses K.1 to K.3 are then fed through their respective flip-flops 211-213, oscillator 22 to transducer 31.

If a measuring station 1 is operated to compile a plurality of measured values together with an echo sounder which permits switching to different sounding directions, it is possible, according to the present invention, to employ the switching mechanism 35 as a programmed switching mechanism for the simultaneous switching to different sounding directions and to different measuring value generators 19. Such programmed switching mechanisms are well known in the art.

On board ship $b$, there is normally provided a special echo sounder for measuring the total depth of the water $D_0$ below the ship $b$. If required, the clock pulse generator of this echo sounder can also be used as the primary clock pulse generator of the present invention. In this case, actuation pulses produced by the primary clock pulse generator are transmitted through the transmission channel 3 to the secondary clock pulse generator 24 at the measuring station 1, whereas the artificial echo pulses E' coming from measuring station 1 are fed in the above-described manner to the observation station 2 and there effect an indication of the measured values. The present invention is, moreover, not limited to the use of a periodically operating short-interval ranging device, but can also be used in conjunction with measuring devices having freely selectable measuring sequences. Parts of the echo sounder, as for example the pulse generator and the preamplifier, can also be combined with the measuring station to form a structural group. This is particularly useful when the transmission channel consists not of a cable, but of a sound transmission path.

It will be understood that the above description of the present invention is susceptible to various modifications, changes and adaptations, and the same are intended to be comprehended within the meaning and range of equivalents of the apended claims.

We claim:

1. An apparatus for compiling at an observation location measured values of a variable parameter existing at a measuring location spaced from the observation location, comprising, in combination:
    a. transmission means connected between the measuring location and the observation location;
    b. a measuring value generator disposed at the measuring location for producing a signal which is a function of the instantaneous value of the variable parameter;
    c. a pulse duration modulator connected to the output of said measuring value generator to receive the signal fed out therefrom for producing a modulated pulse the duration of which is a function of the instantaneous value of the variable parameter;
    d. a clock pulse generator connected to said pulse duration modulator for controlling the initiation of such modulated pulses;
    e. means emitting a train of spaced wave pulses and connected to said clock pulse generator for causing the modulated pulses to be produced in a fixed time relation with the wave pulses; and
    f. short-interval range recording means disposed at the observation location and connected for receiving the modulated pulses and recording their duration.

2. An apparatus as defined in claim 1, further comprising means connected to the output of said pulse duration modulator to emit an artificial echo pulse which is adapted to the transmission characteristics of said transmission channel at the end of the duration of the modulated pulse.

3. An apparatus as defined in claim 2 wherein said means to emit an echo pulse includes a monostable multivibrator connected with the output of said pulse duration modulator, and an oscillator connected to the output of said monostable multivibrator.

4. An apparatus as defined in claim 3 wherein said train of spaced wave pulses has a carrier frequency and the frequency of said oscillator corresponds to the carrier frequency of the wave pulses.

5. An apparatus as defined in claim 4, wherein said means emitting a train of wave pulses includes means to receive the echo of the wave pulses, and further including short-interval range recording means for measuring and indicating the travel time of the wave pulses and the duration of the modulated pulses.

6. An apparatus as defined in claim 5, further including means disposed at the observation location for varying the timing of the train of spaced wave pulses, and means disposed at said measuring location connected to said means for varying the timing of the train of spaced wave pulses to adjust said pulse duration modulator as a function of the spacing of the wave pulses.

7. An apparatus as defined in claim 6, wherein said means for varying the spacing of the wave pulses is a measuring range selector.

8. An apparatus as defined in claim 7, wherein said means for adjusting said pulse duration modulator is a counting and gating circuit which varies said pulse duration modulator inversely proportional to the spacing of the wave pulses.

9. An apparatus as defined in claim 8 wherein said clock pulse generator is an adjustable clock pulse generator varying its frequency so that it corresponds with the spacing of the wave pulses.

10. An apparatus as defined in claim 9 further including a battery disposed at the measuring location to be a current source and which is connected with means disposed at the observation location to connect and disconnect it to the system.

11. An apparatus as defined in claim 10, further including switching means disposed at said measuring location and connected in series with said battery, and timing means disposed at said measuring location and connected to said switch means to control said switch means, so that said switch means connects said battery into the system when wave pulses are being emitted and disconnects said battery from the system when no wave pulses are being emitted.

12. An apparatus as defined in claim 11, further including a water-pressure sensitive switch connected in series with said battery for connecting the battery into the system when a predetermined minimum pressure has been exceeded.

13. An apparatus as defined in claim 1, wherein a plurality of measuring value generators are disposed at at least one measuring location, and wherein each generator is connected to a respective one of a plurality of pulse duration modulators.

14. An apparatus as defined in claim 13, further including means to distinguish the measured value signals of the respective measuring value generators from one another.

15. An apparatus as defined in claim 14 further including switching means which can interrogate said plurality of measuring value generators.

16. An apparatus as defined in claim 15, wherein said switching means is a shift register.

17. An apparatus as defined in claim 16 wherein said means for emitting a train of spaced wave pulses is a plurality of acoustical transducers each sending out pulses in a different sounding direction, and wherein said plurality of measuring value generators are each connected to a respective one of said plurality of acoustical transducers.

18. An apparatus as defined in claim 17 wherein said switching means switches said measured value generators to correspond to the acoustical transducers, and wherein said switching means is a programmed switching mechanism.

19. An apparatus as defined in claim 18 further including a towed fishing net, and wherein there are two measuring locations and the variable parameter is temperature, a first measuring location being disposed at a temperature measuring location at the top of said net and a second measuring location being disposed at a temperature measuring location at the bottom of said net.

* * * * *

UNITED STATES PATENT OFFICE
CERTIFICATE OF CORRECTION

Patent No. 3,673,552           Dated June 27th, 1972

Inventor(s) Michel Aubert, Siegfried Mross, Hans Grossheim

It is certified that error appears in the above-identified patent and that said Letters Patent are hereby corrected as shown below:

In the heading of the patent, after "Inventors:" delete "Siegfried Mross; Hans Grossheim, both of Bremen, Germany; Michel Aubert, Wimermeux, France" and substitute therefor --Michel Aubert, Wimereux, France; Siegfried Mross; Hans Grossheim, both of Bremen, Germany--. Column 8, line 4, after "10th" delete "to".

Signed and sealed this 5th day of December 1972.

(SEAL)
Attest:

EDWARD M. FLETCHER, JR.           ROBERT GOTTSCHALK
Attesting Officer           Commissioner of Patents